Patented Jan. 14, 1936

2,027,967

UNITED STATES PATENT OFFICE 2,027,967

ANTHELMINTIC

Wallace P. Elmslie and Paul Caldwell, Quincy, Ill., assignors to Moorman Manufacturing Company, Quincy, Ill., a corporation of Illinois No Drawing. Application December 15, 1934, Serial No. 757,622

5 Claims. (Cl. 167—53)

The present invention pertains to an improved anthelmintic or vermifuge.

Livestock such as swine are subject to infection by parasitic worms which commonly infest the organs of the digestive tract. In particular, the small intestines of the animals are susceptible of infestation by round worms. Other types of worms infest the stomach. In fact, the feces of an infested animal will quite often show eggs of five or more different types of worms. The worm in some cases feed directly upon the animal system, but principally the worms feed upon the digested or partially digested food consumed by the infested animal. In addition to robbing the animal of nutriment, the worms give off toxins which are of considerable detriment to the animal system.

Numerous anthelmintic treatments have been suggested, including the use of laxatives and materials such as nicotine and its salts.

A principal object of the present invention is the provision of an improved anthelmintic and method of administering the same to an infested animal.

An additional object is the provision of an anthelmintic which may be administered to an infested animal in small quantities and without the necessity of catching the animal to be treated and forcing the medicine into its digestive tract.

A further object is to provide an anthelmintic treatment which may be administered over a plurality of feedings with the ration normally consumed by the animal.

These and other objects will be observed and understood upon a consideration of the following description.

In accordance with our invention it has been found that a material which heretofore has been well known as a poison for all classes of animals, including vertebrates as well as non-vertebrates, may by proper administration be highly effective as an anthelmintic without a deleterious effect upon the host. The material referred to comprises soluble fluorine, and the treatment includes the administration of the fluorine in the form of a salt which will make the fluorine available in the soluble form in the internal organs of the animal.

Normally, anthelmintic remedies are administered to an infected animal in relatively large quantities by manually forcing the dose into the animal's digestive tract, this treatment making it necessary to capture the animal and to force the dose of anthelmintic down the animal's throat. Under such conditions an effort was made to administer sufficient quantity of the anthelmintic in one dose to obviate the necessity for repeating the treatment.

Within recent years the toxic nature of fluorine and its compounds has been put to advantage in the spraying of fruit trees, and in connection with this work considerable investigation has been carried on by the agricultural departments of certain states to determine the toxic effect of the fluorine upon animals apt to consume fruit from the sprayed orchards. The well known insecticidal nature of fluorine compounds renders the materials well adapted for such purposes as spraying orchards, but the toxic nature of the compounds on animals consuming the sprayed fruit makes the process somewhat hazardous. For insecticidal purposes resort usually is made to insoluble fluorides.

Natural rock phosphates such as those obtainable from Tennessee and Montana have been suggested for use in livestock feed and in fertilizers. These natural rock phosphates contain a fluorine content which ordinarily is of the order of from 2% to 3% or more of fluorine. Many years experience has shown that the use of the natural rock phosphate in livestock feed is highly injurious to the animal due to the presence of fluorine, and a number of patents have been obtained for processes for eliminating fluorine from rock phosphate in order to render the latter suitable for feeding purposes. Reference is made to Caldwell Patent No. 1,902,832 and Patent No. 1,712,404 to Rupp as examples of such patents.

After extensive research we have found that by proper administration the fluorine may be availed of as a highly effective anthelmintic without producing injury upon the animal, and a more particular description of our method of administration now will be described.

The most noticeable stage for the infestation of swine by worms is before the swine have reached maturity. Pigs infested with worms are placed on a ration of feed with which are admixed small quantities of salt which will make soluble fluorine available in the internal organs of the animal. Preferably, the feed with which the anthelmintic is admixed is wheat middlings. Grain chops or other organic feed stuffs normally constitute the diet of swine and we have found that these feed stuffs provide a buffering action which protects the internal organs of the swine from the action of the fluorine. The buffering action with respect to the host does not extend to the parasite and the fluorine is operable to effectively eliminate the worms from the animal system. If administered directly to the animal system without admixture with a buffering agent the fluorine would have a highly deleterious effect on the animal organism. While we do not wish to be bound by theory, it is possible that the action of the buffering agent is to maintain the fluorine in mechanically incorporated condition so that a small portion only of the total quantity of fluorine contacts the internal organs at any particular spot.

It is our further discovery that the proper method of administering the soluble fluorine is to combine it with the ration in quantities below that effective to produce a complete anthelmintic action in one feeding. When fed in a plurality of feedings we have found that this ration will act as a complete anthelmintic without producing any appreciable deleterious action on the internal organs of the animal.

It is preferred that the soluble fluorine be employed in the form of a soluble inorganic salt such as sodium fluoride and potassium fluoride. In the case of sodium and potassium fluorides, the product is highly soluble and substantially all of the fluorine is available in the internal organs of the animal in a soluble form. The particular amounts to be used in accordance with our process may be calculated on the basis of sodium fluoride, in which case the sodium fluoride is admixed with the feed in quantities which may range from 0.1 and 1.0 per cent, based on the weight of the feed. As fluorine comprises approximately 45 per cent of the sodium fluoride it will be seen that in the case of other fluorine salts the proper amount of materials to be employed may be calculated readily.

The ration and the fluorine salt employed in the process are such as to permit an acid condition in the infested organ. For example, in the case of round worms infesting the small intestines of the swine, the feed stuff and fluorine salt are such that the soluble fluorine is in an acid condition in the proximity of the worms. It is desirable to employ a feed for admixture with the fluorine salt which is relatively free of compounds which would tend to decrease the solubility of the fluorine when in the presence of the juices of the digestive system and which would be sufficient to cause an alkaline condition in the infested regions of the internal organs. Calcium compounds when present in sufficient quantities are of this character.

Ordinarily, it will be desirable to feed the infested animal its normal ration of a feed such as wheat middlings having admixed therewith the proper quantity of a salt which will make available soluble fluorine in the infested organs, in daily or preferably twice daily feeds for approximately three days to insure a complete anthelmintic action. Extensive experimentation has shown that after about three feedings have taken effect, that is, passed through the infested zone, the antehlmintic action will be complete. To make sure that no worms are allowed to remain in the animal system, it is well to continue the ration for a period of three or more days. The ordinary treatment should include at least four feedings, and it is preferred that these feedings be consecutive. Since a smaller quantity of the fluorine containing salt than is necessary to comprise an anthelmintic dose is employed in each feed, the cycle of treatments should be maintained with care.

The upper limit of the amount of fluorine which may be employed is determined by the deleterious action of the fluorine on the internal organs of the swine and the lower limit of the amount of the fluorine salt is the quantity which will offer a plurality of feedings to produce substantially complete expulsion of worms. By combining a laxative with the soluble fluorine, this range may be lengthened in both directions with good results. The combination with a laxative will permit the use of substantially 0.08 per cent sodium fluoride or its equivalent in other sodium compounds with effective anthelmintic results and as much as 1.5 per cent sodium fluoride may be employed without producing a substantially deleterious effect on the animal digestive organs. Apparently, the action of the laxative is to increase the travel of the ration and fluorine compound through the digestive tract and in so doing the amount of contact of the fluorine compound with the digestive tract is decreased, and at the same time a more concentrated solution of fluorine will contact the worms to be expelled. Sodium sulphate may be employed as the laxative, or any of the other well known laxative agents may be used. Some of these laxatives are known to have mild vermifuge properties of themselves, but when used in accordance with the present invention the laxatives exercise a protective action on the tissue of the digestive tract while assisting the destructive action of the fluorine on the worms.

Reference has been made to sodium and potassium fluorides and the ranges specified herein are based upon the quantity of fluorine made available in the internal organs of the swine by the use of the sodium fluoride. When other flourine salts such as calcium fluoride and magnesium fluoride are employed, larger quantities of the salts generally are required to make available the same quantity of soluble fluorine as would be made available by the specified quantity of sodium fluoride. By maintaining an acid condition in the infested zone, the solubilities of such salts as calcium fluoride and magnesium fluoride are increased, and it is possible to work out the particular amounts of the salt to be used in any given case. A salt such as ammonium fluoride may be used in equivalent amounts to the amounts of sodium fluoride specified.

In previous treatments for expelling worms from swine, the animals generally lose weight during the treatment. When treated as specified herein, the animals practically always gain weight, as a normal ration is fed to the animals and the anthelmintic does not decrease the appetite or produce other substantially deleterious effects. The administration of a smaller quantity of fluorine in each feed than is necessary for complete anthelmintic purposes and the use of a plurality of such feeds effects a complete expulsion of worms and the process otherwise has many advantages, such as ease of administration. The fluorine salt is mixed with the ration and placed before the animal. It is not necessary to manually handle the animal or to force the anthelmintic into the animal's digestive tract. After a sufficient number of feedings have been made to complete the anthelmintic action and the worms have been passed by the swine, the ration may be continued without the anthelmintic agent therein.

It will be understood that the invention has been described for purposes of illustration and explanation and that changes and variations are possible without departing from the scope of the invention. All such modifications and changes are intended to be included in the appended claims.

We claim:

1. An anthelmintic ration of the type described, comprising a quantity of an alimentary product having admixed therewith a small quantity of a fluorine-containing salt of the type operable to supply soluble fluorine in the internal organs of an animal, the quantity of said salt being insufficient substantially to injure the animal.

2. An anthelmintic ration of the type described, comprising a quantity of an organic feed having admixed therewith a laxative and a small quantity of a fluorine-containing salt of the type operable to supply soluble fluorine in the internal organs of the animal, the quantity of said salt being insufficient to produce substantial injury to the animal.

3. An anthelmintic of the type described, comprising an organic feed having admixed therewith a quantity of a fluorine-containing salt insufficient to substantially injure an animal operable to make available in the internal organs of the animal an amount of fluorine equivalent to the amount made available by sodium fluoride in percentges of from 0.1 to 1.0.

4. An anthelmintic of the type described, comprising an organic feed having admixed therewith a laxative and a quantity of a fluorine-containing salt in a proportion insufficient to substantially injure an animal when administered over a plurality of feedings and operable to make available in the internal organs of an animal an mount of fluorine equivalent to the amount made available by sodium fluoride in percentage of 0.08 to 1.5.

5. An anthelmintic of the type described, comprising an alimentary product containing a fluorine compound in quantities insufficient to produce substantial and permanently deleterious effects upon the internal organs when taken internally a plurality of times, said compound and the quantity thereof present in said product being operable to produce an anthelmintic effect when administered over a plurality of feedings.

WALLACE P. ELMSLIE.
PAUL CALDWELL.